No. 815,947. PATENTED MAR. 27, 1906.
A. R. FERGUSSON.
BRACKET.
APPLICATION FILED DEC. 31, 1904.
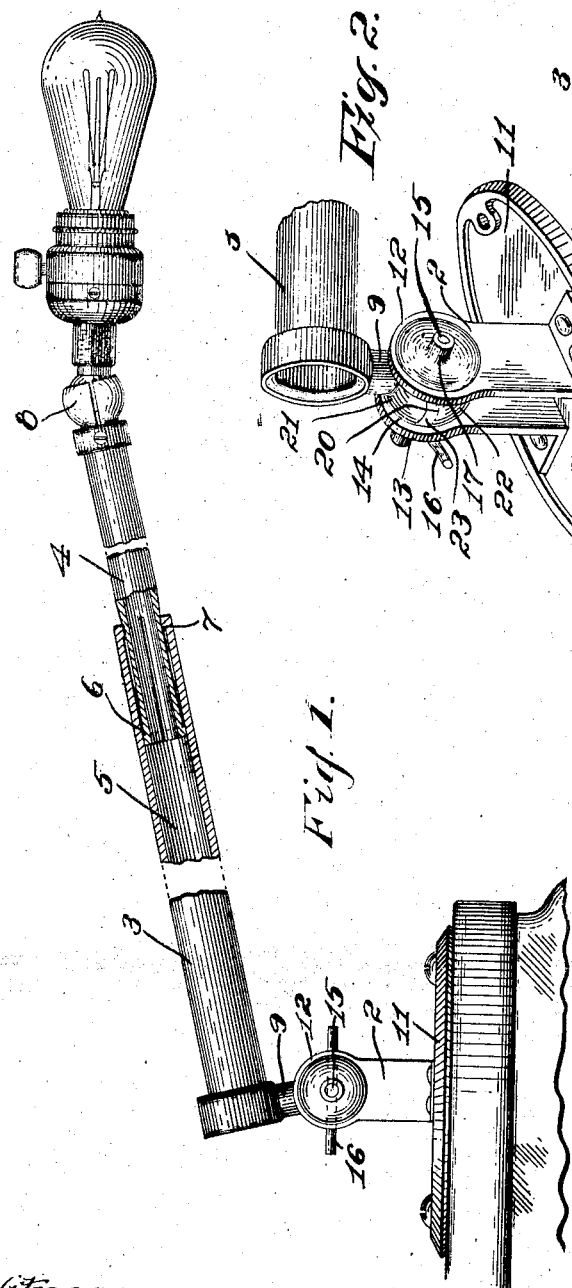
Witnesses:
Inventor:
Alan R. Fergusson,
By his attorney,
F. H. Richards

UNITED STATES PATENT OFFICE.

ALAN ROBB FERGUSSON, OF NEW YORK, N. Y.

BRACKET.

No. 815,947.   Specification of Letters Patent.   Patented March 27, 1906.

Application filed December 31, 1904. Serial No. 239,126.

*To all whom it may concern:*

Be it known that I, ALAN ROBB FERGUSSON, a citizen of the United States, residing in the borough of Manhattan, city of New York, in the county of New York and State of New York, have invented certain new and useful Improvements in Brackets, of which the following is a specification.

This invention relates to brackets, it more particularly relating, however, to the joint or coupling between the arm and its support, the object of the invention being to provide a simple and efficient universal joint, while rigidly maintaining the movable member or arm of the bracket in its adjusted position, and which is not only simple and efficient in operation, but inexpensive to manufacture.

In the drawings accompanying and forming a part of this specification, Figure 1 is a view, partly in section, of one form of this bracket adapted for supporting an incandescent lamp. Fig. 2 is a perspective view of this improved joint. Figs. 3 and 4 are sectional views illustrating this improved joint. Fig. 5 is a view illustrating the members of the joint, and Fig. 6 is a view of a modification thereof.

Similar characters of reference indicate like parts in all the drawings.

This improved bracket, which may be used to support various devices, comprises in the form shown a standard or supporting member 2 and an adjustable member or arm 3. The adjustable member or arm 3 in the present instance comprises a telescopic arm, one member, as 4, sliding within the other, as 5, being provided with shoulders 6 and 7 to limit the extension thereof. The sliding member 4 is provided with a suitable joint or coupling for the support of the particular device to be carried thereby and which in the present instance is shown as a ball-and-socket joint 8, whereby the lamp may be moved in various directions. The inner end of this arm is provided with a projection or stud 9, shown located at right angles to the arm, for carrying one part of the joint. The standard 10, which may be of any suitable form, is shown secured to a plate 11, which is adapted for attachment to a desk or other means of support. This standard is shown comprising a pair of members 12 and 13, each having a concaved part or socket 14 and an axial opening 15 extending therethrough for the passage of a clamping-bolt 16, one of such members, as 13, being preferably provided with a threaded portion 17, into which the threaded end 18 of the bolt projects. The ball member 20 of this joint is made up of several members. In one form it comprises a pair of substantially hemispherically-formed members 21 and 22, one of which, as 21, is shown secured to or formed integral with the projection or stud 9 of the arm, and between which is located a disk 23, having an opening 24 therethrough through which the clamping-bolt passes. When assembled, the parts are secured in firm engagement with each other by the members 12 and 13 and the clamping-bolt, the bolt forming the axis for the ball when it is desired to swing the arm up and down. When it is desired to move the bracket in a horizontal direction, the disk 23 remains stationary, while that portion of the ball to which the arm is connected rotates upon it. This form of joint permits a vertical movement and substantially a universal movement of the ball relative to the socket, while at the same time maintaining the parts in firm frictional engagement, so that when the bracket is adjusted it will remain in such adjusted position.

In the form shown in Fig. 6 the disk or intermediate member of the ball is done away with, the lower hemisphere 30 being provided with a groove or recess 31 for the passage of the bolt, the groove being so located that the periphery of the bolt will be flush with the flat surface 32 of the grooved ball member, and thus not interfere with the rotation of the other ball member relative to the grooved member thereof. The same movement of the parts is obtained in this structure as in that just described.

The term "ball" or "ball member" as used herein and in the claims is not to be interpreted as a limitation to a sphere, since in the form shown in Figs. 1 to 5 the lower hemispherical member could be as illustrated in Fig. 4 or in some structures entirely dispensed with, while the lower hemisphere of Fig. 6 may be flattened out at the pole, as illustrated, the term "ball" or "ball member" being used as an apt term to define the structure.

I claim as my invention—

1. A joint comprising ball and socket members and a clamping-bolt maintaining the parts in proper working position, said bolt forming an axis for the ball to turn upon, one part of said ball having movement independently of another part thereof.

2. A joint comprising ball and socket members and a clamping-bolt maintaining the parts in proper working position, said bolt forming an axis for the ball to turn upon, one part of said ball having rotary movement independently of another part thereof.

3. A joint comprising a socket member and a ball formed of several parts, located in said socket member for movement as a whole in one direction, one part having movement independently of the other in another direction.

4. In a device of the character described, the combination of two members, one having a socket and the other a ball comprising several parts, and means for clamping said parts and socket together, such means being arranged to limit the movement of one of said parts except upon the clamping means as an axis, another of said parts being movable independent of the clamping means.

5. In a device of the character described, the combination of two members, one member comprising a pair of concaved jaws, a ball member comprising several parts, a clamping member passed through one of said ball parts and secured in said jaws, the ball as a whole turning on said clamping member, an arm radially secured to one of the ball parts, said latter part being rotatable in said jaws with relation to the ball part engaging the clamping member.

6. The combination of an arm, a clamping member composed of a pair of concaved jaws, a ball comprising a pair of spherical segments, one of such segments being secured to said arm, a clamping-bolt projecting through another of said segments and into the jaws, upon which bolt said segment turns as an axis, the ball-segment secured to the arm being rotatable independent of said other segment engaging the bolt.

7. A ball-and-socket joint comprising a socket member and a ball composed of several parts, and clamped in the socket by a bolt passing through one of said ball parts and into the socket member, the ball as a whole being rotatable upon said bolt as an axis, one of said ball parts not engaged by the bolt being movable independent of said part.

Signed at Nos. 9 to 15 Murray street, New York, N. Y., this 30th day of December, 1904.

ALAN ROBB FERGUSSON.

Witnesses:
   R. C. Heather,
   Arthur S. Alexander.